United States Patent [19]
Hinds et al.

[11] Patent Number: 5,367,477
[45] Date of Patent: Nov. 22, 1994

[54] METHOD AND APPARATUS FOR PERFORMING PARALLEL ZERO DETECTION IN A DATA PROCESSING SYSTEM

[75] Inventors: Christopher N. Hinds; Daniel T. Marquette; Jack Wu, all of Austin, Tex.

[73] Assignee: Motorola, Inc., Schaumburg, Ill.

[21] Appl. No.: 158,326

[22] Filed: Nov. 29, 1993

[51] Int. Cl.[5] .......................... G06F 7/00; G06F 7/50
[52] U.S. Cl. .................................. 364/736.5; 364/784
[58] Field of Search ...................... 364/736.5, 768, 784

[56] References Cited

U.S. PATENT DOCUMENTS

| | | | |
|---|---|---|---|
| 3,983,382 | 9/1976 | Weinberger | 364/736.5 X |
| 4,815,019 | 3/1989 | Bosshart | 364/736.5 |
| 4,878,189 | 10/1989 | Kawada | 364/736.5 |
| 5,020,016 | 5/1991 | Nakano et al. | 364/736.5 |
| 5,091,874 | 2/1992 | Watanabe et al. | 364/736.5 X |
| 5,270,955 | 12/1993 | Bosshart et al. | 364/736.5 |

*Primary Examiner*—Tan V. Mai
*Attorney, Agent, or Firm*—Keith E. Witek

[57] ABSTRACT

A zero detection method (FIG. 5) and a zero detection apparatus (FIGS. 2-4) involves determining if the sum of at least two operands and a carry-in bit will produce a zero result. The zero detection is performed in parallel to another system calculation, such as an addition or subtraction of the two operands. The zero detection logic has a hierarchical structure (see FIG. 4) which is used to reduce logic and quicken the zero detect process of FIG. 5. Zero detection may occur for more than one group of bits within the two operands. The zero detection is used, in a preferred form, primarily in floating point operations such as floating point additions.

20 Claims, 4 Drawing Sheets

METHOD AND APPARATUS FOR PERFORMING PARALLEL ZERO DETECTION IN A DATA PROCESSING SYSTEM

FIELD OF THE INVENTION

The present invention relates generally to semiconductor circuits, and more particularly, to zero detection circuits for floating point data processing systems.

BACKGROUND OF THE INVENTION

FIG. 1 illustrates a known circuit for performing a zero detection, via a zero detection circuit 12, for an adder 10. The zero detection circuit 12 is required to wait on the completion of the addition in adder 10 before generating the output. If the carry-in input to the adder arrives late relative to the input operands, the delay for the output of the zero detection circuit is a function of the carry-in delay, the completion of the adder once the carry-in signal is stable, and the delay through the zero detection logic. Using conventional static circuitry, this added time can be excessive for circuitry in which the all_zero signal of FIG. 1 is in the critical path. The presence of the zero detection circuit in the sum data path adds loading to the outputs of the adder, which can create additional delay for the resolution of the sum.

Another known method for performing zero detection is performed parallel with the addition, however, no capability exists for inclusion of a carry-in from an operation on lower order bits of operands A and B. The exclusion of the carry-in bit results in an inability to perform zero detection on a select group of bits, out of the two operands A and B. Instead, all bits of the two operands A and B must be input to the zero detect logic which increases the surface area of circuitry.

SUMMARY OF THE INVENTION

The previously mentioned disadvantages are overcome and other advantages achieved with the present invention. In one form, the present invention comprises a zero detection circuit for use in a data processing system. The zero detection circuit having a first input for receiving a first operand, a second input for receiving a second operand, a third input for receiving a carry bit, a plurality of combination logic circuits, and a global circuit. Each of the combinational logic circuits within the plurality of the combinational logic circuits receives a portion of the first operand and a portion of the second operand as inputs. No two combinational logic circuits receive as input an identical portion of the first operand and an identical portion of the second operand. Each of the combinational logic circuits within the plurality of the combinational logic circuits generates a first control signal to indicate whether the sum of the respective portion of the first operand and the respective portion of the second operand produce a zero result. Further, each of the combinational logic circuit within the plurality of the combinational logic circuits generates a second control signal to indicate whether the sum of the respective portion of the first operand and the respective portion of the second operand produce a result having all logic one values. The global circuit receives each of the first and second control signals from the plurality of the combinational logic circuits. The global circuit provides an output which indicates whether a sum of the first operand and the second operand produce a zero result in response to the first and second control signals and the carry bit.

In another form, the invention comprises an adder circuit for use in a data processing system. The adder circuit has circuitry for adding a first binary value which has a first predetermined number of bits and a second binary value which has a second predetermined number of bits. The circuitry for adding having a first input for receiving the first binary value, a second input for receiving the second binary value, a third input for receiving a carry-in bit, and a first output for providing a sum of the first and second binary value. The adder circuit also has zero detection logic which has a first input for receiving the first binary value, a second input for receiving the second binary value, and a third input for receiving the carry-in bit. The zero detection logic having an output which indicates whether the sum of a portion of the first binary value, a portion of the second binary value, and the carry-in bit produces a zero result. The sum of a portion of the first binary value, a portion of the second binary value, and the carry-in bit having a third predetermined number of bits.

In yet another form, the invention comprises a method for determining whether the sum of a predetermined number of bits of two operands is equal to zero. The method involves providing a first operand to a zero detection circuit, the first operand having M bits wherein M is a finite integer greater than zero. A second operand is provided to the zero detection circuit, the second operand having M bits wherein M is a finite integer greater than zero. A carry bit is also provided to the zero detection logic. The first operand, the second operand, and the carry bit are processed to provide a global control signal which is asserted if a sum resulting from the first operand and the second operand and the carry bit would produce a zero result.

The present invention will be more clearly understood from the detailed description below in conjunction with the accompanying drawings.

Figure 1:
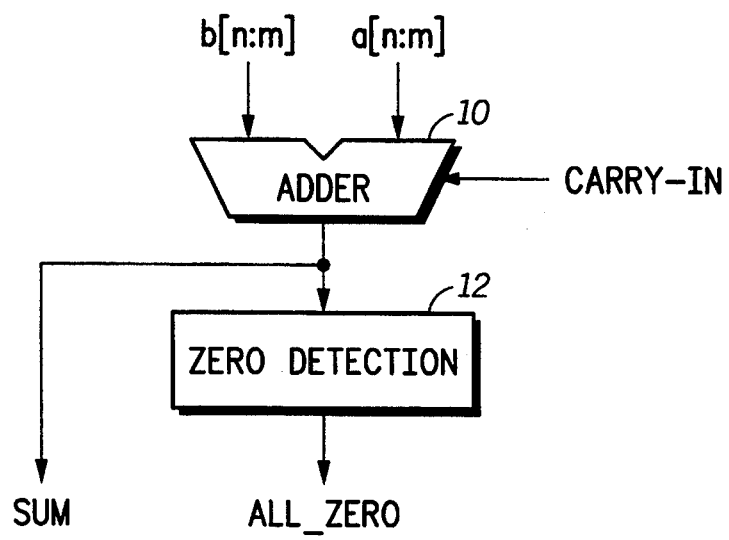
FIG. 1 illustrates, in a block diagram, a known serial connection between an adder circuit and zero detection circuit.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

Generally, the present invention provides a method and apparatus for providing zero detection within a data processor. In particular, the invention provides a method for performing binary zero detection for a floating point adder in parallel to a floating point addition operation/unit. Two binary operands (a and b) and a carry-in bit are processed to determine if the final sum of the upper N bits of the two operands and the carry_in bit would produce a zero result. Input operands are considered in bit-parallel to detect for each pair of bits whether these bits would generate a sum bit which would be zero, or which would propagate a carry-in to the next pair of bits, or which would generate a carry-into the next pair of bits. This information is combined in subsequent levels of combinational logic to produce an output signal which is asserted if the specified number of bits would produce a zero sum and a second output signal which is asserted if the specific number of bits would produce an all-ones sum. These output signals are combined in combinational logic with the carry-in bit from the addition of any lower-order bits to produce a final output signal which is asserted if the specified number of bits of the two operands produce a zero sum.

The ability to perform the zero detection of a sum of operands in parallel with the addition of the operands removes the zero detection from the primary data path of the data processor, decreasing the delay through that path and producing the zero detection signal significantly earlier than if the zero detection was required to wait on the result of the addition.

The inclusion of the carry-in bit in the processing of the two operands allows for zero detection of the sum of binary operands larger than those presented to the zero detection logic. The lower order bits of the operands can be processed, either by addition followed by more conventional zero detection methods, or a method similar to the one presented herein, and the result of the zero detection on the lower order bits and the carry-out bit is all that is required by the zero detection logic to perform a zero detection on the larger operands.

The implementation of the logic may be done in a hierarchical fashion as dictated by size and speed requirements of the design. The generation of the outputs signaling an all zero or all ones result may be done on any number of bits of the input operands in one type of block and combined in another type of block. These blocks will be discussed in detail.

This invention allows for the use of static logic, making it useful in low-power or power critical designs. Data processors which must be able to enter a "stopped" or power-down state for power conservation benefit from the use of static logic to reduce complexity in clocking and aid in timing analysis and frequency range.

The invention may be further understood via the prior art FIG. 1 included herein. FIG. 1 illustrates a known method for performing a zero detection, via a zero detection circuit 12, for an adder 10. The zero detection circuit 12 is required to wait on the completion of the addition in adder 10 before generating the output. If the carry-in input to the adder arrives late relative to the input operands, the delay for the output of the zero detection circuit is a function of the carry-in delay, the completion of the adder once the carry-in signal is stable, and the delay through the zero detection logic. Using conventional static circuitry, this added time can be excessive for circuitry in which the all_zero signal of FIG. 1 is in the critical path. The presence of the zero detection circuit in the sum data path adds loading to the outputs of the adder, which can create additional delay for the resolution of the sum.

Another known method for performing zero detection is performed parallel with the addition, however, no capability exists for inclusion of a carry-in from an operation on lower order bits of operands A and B. The exclusion of the carry-in bit renders zero detection useless for large operands in which a number of lower order bits may be considered earlier (or in parallel with) a number of upper order bits.

Figure 2:
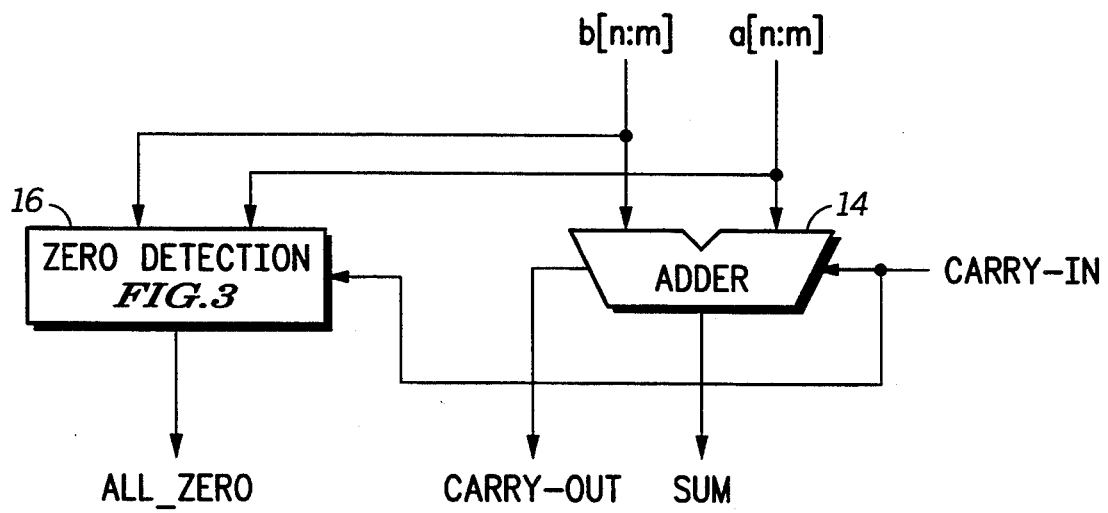
FIG. 2 illustrates, in a block diagram, a parallel connection between an adder circuit and a static zero detection circuit in accordance with the present invention.

The present invention overcomes many of the disadvantages listed above and can be more fully understood with reference to FIGS. 2-5. FIG. 2 illustrates a system having an adder 14 coupled to a zero detection circuit 16. A first binary number, referred to as b[n:m] and having n to m bit positions, is input into both the adder 14 and the zero detection circuit 16 in a parallel manner. In addition, a second binary number, referred to as a[n:m] and having n to m bit positions, is input into both the adder 14 and the zero detection circuit 16 in a parallel manner. FIG. 2 illustrates the adder 14 which generates a sum based upon the first and second binary numbers (a and b) and the carry-in bit. It is often the case that the carry-in bit arrives late relative to the first and second binary numbers, and the adder must be designed to accommodate this late carry-in within the allowed delay in generation of the sum output. The zero detection circuit 16 receives the first and second operands and the carry-in bit and processes the data in parallel with the adder 14, generating the all_zero signal before the output of the adder 14 is stable. The zero detection circuit 16 is capable of handling a very late carry-in signal. The removal of the zero detection circuit from the sum data path removes the loading on the outputs of the adder from the zero detection circuit 16.

Figure 3:
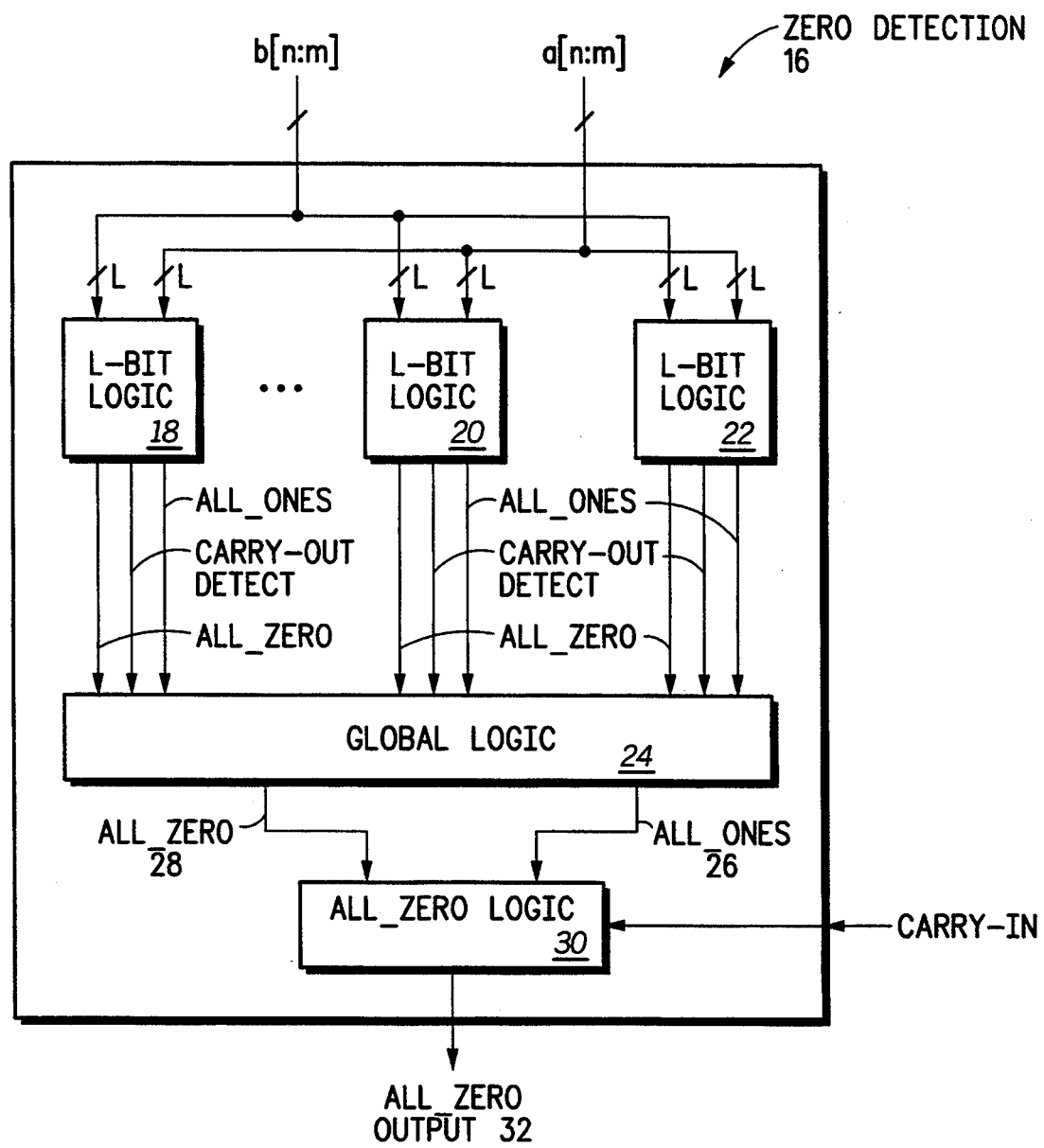
FIG. 3 illustrates, in a block diagram, a more detailed view of the zero detection circuit illustrated in FIG. 2 in accordance with the present invention.

FIG. 3 illustrates the zero detection circuit 16 of FIG. 2 in more detail. FIG. 3 illustrates a system with a first binary number, referred to as b[n:m] and having n to m bit positions, input to a row of L-bit Logic circuits 18, 20, and 22. In addition, a second binary number, referred to as a[n:m] and having n to m bit positions, is input to the row of the L-bit logic circuits 18, 20, and 22. The inputs a and b are segregated into L bit groups, L being less than or equal to n-m+1, each of which is input to a single L-bit logic circuit 18, 20, or 22. Each of the L-bit logic circuits 18, 20, and 22 process the L bits of a and b and generate outputs all_zero, all_ones, and carry-out detect. The output all_zero is asserted when the sum of the L input bits of the inputs a and b result in L logic zero bits. The output all_ones is asserted when the sum of the L input bits of inputs a and b result in L logic one bits. The output carry-out detect is asserted if the sum of the L bits of inputs a and b would generate a carry into the Lth bit position, given the least significant bit position being labeled the 0th bit position.

The selection of L is a compromise between speed and size. The larger the value of L, the greater the size of the L-bit logic circuits 18, 20, and 22 and the fewer levels of hierarchy required to resolve the final output signals all_zero 28 and all_ones 26. Table 1, included below, lists the outputs all_zero (az), all_ones (ao), and carry-out detect (cod) for 2-bit inputs a and b which will assert all_ones (ao) control signal. Table 2, included below, lists the combinations of 2-bit inputs a and b which will assert the all_zero (az) control signal and carry-out detect (cod). The signals output may either be active low or active high, in the Tables 1 and 2, the signals are active high. It should be noted that the L-bit logic circuits of FIG. 3 may be expanded to any size, producing the az, ao, and cod outputs for any number of input bits.

TABLE 1

|    |    |     |           | Outputs |    |     |
| -- | -- | --- | --------- | ------- | -- | --- |
| a  | b  | sum | carry out | az      | ao | cod |
| 00 | 11 | 11  | 0         | 0       | 1  | 0   |
| 01 | 10 | 11  | 0         | 0       | 1  | 0   |
| 10 | 01 | 11  | 0         | 0       | 1  | 0   |
| 11 | 00 | 11  | 0         | 0       | 1  | 0   |

TABLE 2

|    |    |     |           | Outputs |    |     |
| -- | -- | --- | --------- | ------- | -- | --- |
| a  | b  | sum | carry out | az      | ao | cod |
| 00 | 00 | 00  | 0         | 1       | 0  | 0   |
| 01 | 11 | 00  | 1         | 1       | 0  | 1   |
| 10 | 10 | 00  | 1         | 1       | 0  | 1   |
| 11 | 01 | 00  | 1         | 1       | 0  | 1   |

The Global Logic circuit 24 receives as inputs the all_zero, all_ones, and carry-out detect outputs of all the L-bit logic circuits 18, 20, and 22 and generates a single all_zero 28 control signal and a single all_ones 26 control signal. The output all_zero 28 is asserted if the least significant n-m+1 bits of the sum of the two binary inputs a and b would result n-m+1 bits of zero. The output all_ones 26 is asserted if the least significant n-m+1 bits of the sum of the two binary inputs a and b would result n-m+1 bits of one. For the case of two two-bit L-bit Logic blocks providing outputs az_0, ao_0, cod_0, az_1, ao_1, and cod_1 to a Global Logic block, the equation for the outputs all_zero, all_ones, and carry out detect are:

$$\text{all\_zero} = \text{az\_1} \ \& \ \text{az\_0} \ \& \ \sim\text{cod\_0} \ | \ \text{ao\_1} \ \& \ \text{az\_0} \ \& \ \text{cod\_0}$$

wherein & is an AND operation, | is an OR operation, and ~ is a NEGATE operation.

$$\text{all\_ones} = \text{ao\_1} \ \& \ \text{ao\_0}$$
$$\text{carry out detect} = \text{cod\_1} \ | \ \text{ao\_1} \ \& \ \text{cod\_0}$$

The above equations may be expanded to accommodate inputs from any number of L-bit blocks. Multiple levels of Global Logic circuit 30 blocks may be cascaded to accommodate the size of the input operands a and b and the requirements for size and speed.

The All-Zero Logic circuit 30 receives as input the two outputs all_zero and all_ones from the Global Logic 24 and the carry-in bit and generates the output All-Zero 32. The output All-Zero 32 is generated according to the following equation:

$$\text{All\_Zero 32} = (\text{all\_zero} \ \& \sim\text{carry\_in}) \ | \ (\text{all\_ones} \ \& \ \text{carry\_in})$$

Figure 4:
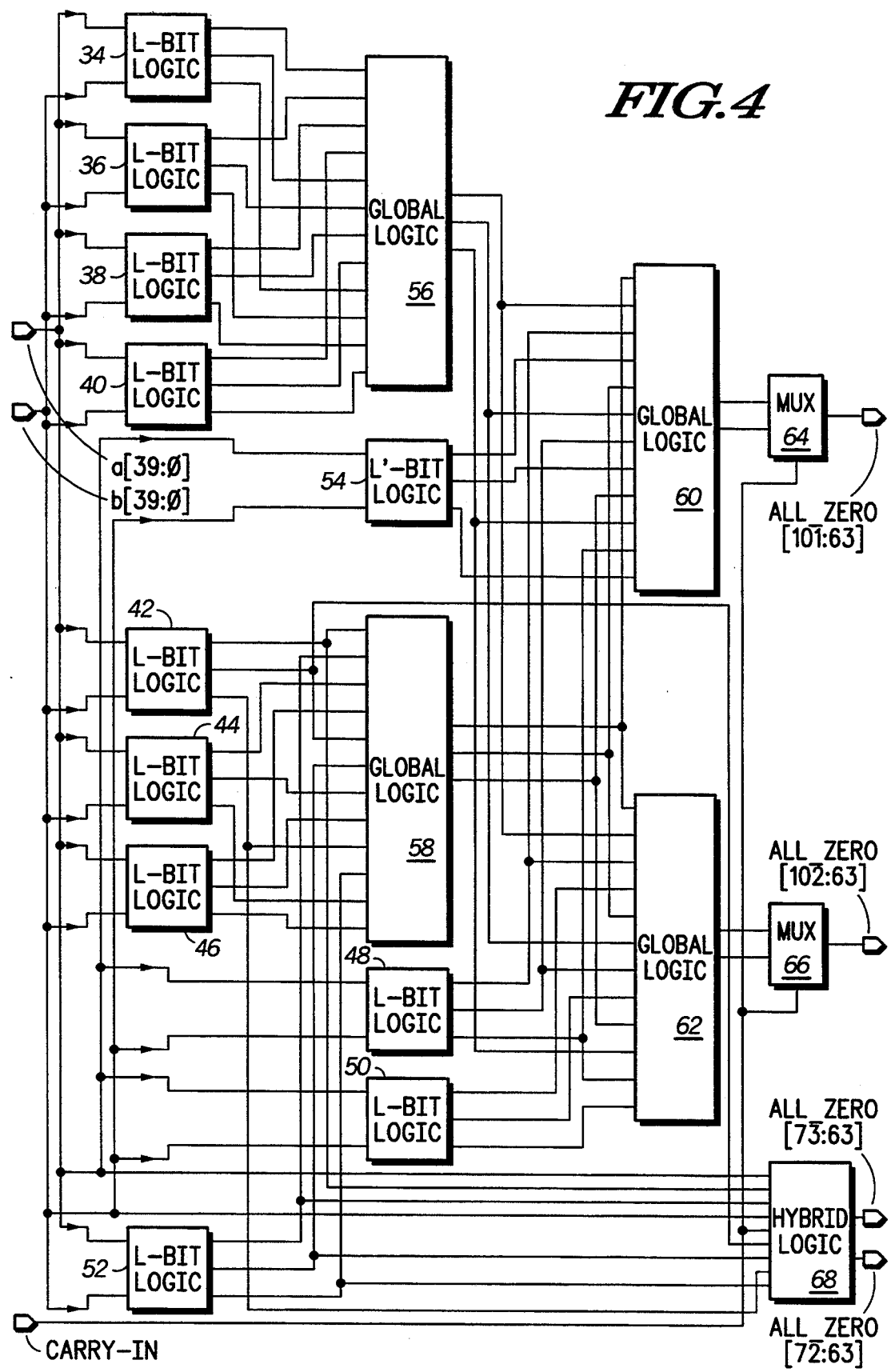
FIG. 4 illustrates, in a block diagram, a detailed view of the zero detection circuit having four zero signal outputs, the zero detection circuit being in accordance with the present invention.

FIG. 4 illustrates a preferred zero detection circuit used for a preferred floating point implementation. FIG. 4 illustrates a system with a first binary number, referred to as b[39:0] and having rank ordered 39 through 0 bit positions, input to a row of L-bit Logic circuits 34, 36, 38, 40, 42, 44, 46, 48, 50, and 52, and one L'-Bit Logic circuit 54. In addition, a second binary number, referred to as a[39:0] and having 39 to 0 bit positions, is input to the same row of L-Bit Logic and L-Bit Logic circuits as the first binary input of FIG. 4. The operands of interest are each preferably 128 bits in width, but may be other widths as well. The lower 64 bits are added in two 32-bit adders and a zero detect is performed on these sums separately. The carry-out bits are propagated upwards. Operands A and B represent bits 102 to 63 of the original 128-bit operands of interest in a preferred form. The inputs a and b are segregated into 3 (L') and 4 (L) bit groups. Each of the 4-bit groups is input to an L Bit Logic circuit, with the 3-bit group input to L' Bit Logic circuit 54.

Each of the L Bit Logic circuits of FIG. 4 performs the following logical computations to arrive at a propagate (p) signal and a generate (g) signal:

$$p[0] = a[0] \wedge b[0] \quad g[0] = a[0] \ \& \ b[0]$$
$$p[1] = a[1] \wedge b[1] \quad g[1] = a[1] \ \& \ b[1]$$
$$p[2] = a[2] \wedge b[2] \quad g[2] = a[2] \ \& \ b[2]$$
$$p[3] = a[3] \wedge b[3] \quad g[3] = a[3] \ \& \ b[3]$$

wherein $\wedge$ is an exclusive or operation (XOR) and & is an AND operation.

The p signals represent the case of the two input bits being either 0 and 1, or 1 and 0, causing a carry in from the next lower order pair of input bits to propagate into the next higher pair of bits. The g signals represent the case of the two input bits being both 1, causing a carry to be generated into the next higher order pair of bits.

The p and g signals are further processed in the L-Bit Logic circuit as:

$$\text{all\_zero} = \sim p[3] \ \& \ \sim p[2] \ \& \ \sim p[1] \ \& \ \sim p[0] \ \& \ \sim g[3] \ \&$$
$$\sim g[2] \ \& \ \sim g[1] \ \& \ \sim g[0] \ | \ \sim p[3] \ \& \ \sim p[2] \ \& \ \sim p[1] \ \&$$
$$\sim p[0] \ \& \ g[3] \ \& \ \sim g[2] \ \& \ \sim g[1] \ \& \ \sim g[0] \ | \ p[3] \ \& \ \sim p[2] \ \&$$
$$\sim p[1] \ \& \ \sim p[0] \ \& \ \sim g[3] \ \& \ g[2] \ \& \ \sim g[1] \ \& \ \sim g[0] \ | \ p[3] \ \&$$
$$p[2] \ \& \ \sim p[1] \ \& \ \sim p[0] \ \& \ \sim g[3] \ \& \ \sim g[2] \ \& \ g[1] \ \&$$
$$\sim g[0] \ | \ p[3] \ \& \ p[2] \ \& \ p[1] \ \& \ \sim p[0] \ \& \ \sim g[3] \ \& \ \sim g[2] \ \&$$
$$\sim g[1] \ \& \ g[0]$$

$$\text{all ones} = p[3] \ \& \ p[2] \ \& \ p[1] \ \& \ p[0]$$

$$\text{carry out detect} = \sim p[3] \ \& \ \sim p[2] \ \& \ \sim p[1] \ \& \ \sim p[0] \ \& \ g[3] \ \&$$
$$\sim g[2] \ \& \ \sim g[1] \ \& \ \sim g[0] \ | \ p[3] \ \& \ \sim p[2] \ \& \ \sim p[1] \ \& \ \sim p[0] \ \&$$
$$\sim g[3] \ \& \ g[2] \ \& \ \sim g[1] \ \& \ \sim g[0] \ | \ p[3] \ \& \ p[2] \ \& \ \sim p[1] \ \& \ \sim p[0] \ \&$$
$$\sim g[3] \ \& \ \sim g[2] \ \& \ g[1] \ \& \ \sim g[0] \ | \ p[3] \ \& \ p[2] \ \& \ p[1] \ \& \ \sim p[0] \ \&$$
$$\sim g[3] \ \& \ \sim g[2] \ \& \ \sim g[1] \ \& \ g[0]$$

wherein the & is an AND operation and the | is an OR operation.

The all_zero output signal is asserted for five cases of input combinations. The first is the trivial case of both input sets of bits containing only zeros. The second through fifth cases represent the input bit patterns in which a pair of bits generates a carry that is propagated through all of the higher order bit pairs, with all bits below the indicated pair containing zeros. The result is that the sum of the input bits would contain only zeros, with a carry out to the next higher order L-Bit Block circuit.

The all_ones output signal is asserted for the case of the two input bit pairs having input patterns which are bit-wise mutually exclusive.

The carry-out detect output signal is asserted for the last four cases of the all_zero equation. This signal does not always assert in the case of a carry-out from an addition of the input bit pairs, however, this is uninteresting unless the all_zero signal asserts.

The Global Logic circuit inputs from the L Bit Logic circuits are here abbreviated as az for all_zero, ao for all_ones, and cod for carry out detect (notice that the figures illustrate that 3 outputs az, ao, and cod are externally routed from the L-bit logic circuits and the Global logic circuits 56 and 58). Specifically, the output of each of the Global Logic circuits 56 and 58 is a signal which is asserted if the sum of the bits input to the L Bit Logic or L'Bit Logic circuits would be zero, namely all_zero (az), and a signal which is asserted if the same sum were to contain only ones, namely all_ones (ao), and a signal which is asserted if the same sum were to generate a carry out named carry out detect (cod). The L bit Logic or L'Bit logic circuits have outputs which are inputs to the Global Logic circuits. In FIG. 4, four L bit logic circuits input to one global logic circuit. The inputs are distinguished in the following equations by appending the numbers 0 through 3 to the end of the variable names az, ao, and cod. These signals follow the following equations:

all_zero = az_3 & az_2 & ~cod_2 & az_1 & ~cod_1 & az_0 & ~cod_0 | ao_3 & az_2 & cod_2 & az_1 &

~cod_1 & az_0 & ~cod_0 | ao_3 & ao_2 & az_1 & cod_1 & az_0 & ~cod_0 | ao_3 & ao_2 & ao_1 & az_0 & cod_0 all_ones = ao_3 & ao_2 & ao_1 & ao_0 carry out detect = cod_3 | ao_3 & cod_2 | ao_3 & ao_2 & cod_1 | ao_3 & ao_2 & ao_1 & cod_0

The output of L-Bit Logic circuits 34, 36, 38, and 40 are input to Global Logic circuit 56, while the output of L Bit Logic circuits 42, 44, 46, and 52 are input to Global Logic circuit 58. The output of Global Logic circuits 56 and 58, with the output of L'Bit Logic circuit 54 and L Bit Logic circuits 48 and 50 are input to Global Logic circuits 60 and 62. The all_zero (az) and all_ones (ao) (the global circuits 60 and 62 have two output control signals) outputs of Global Logic circuit 60 are input to mux 64 with the carry-in bit from the sum of the lower 64 bits of the 128-bit operands generating the all_zero signals for bits 102 through 63.

The output of Global Logic circuits 56 and 58, and the output of L-Bit Logic circuits 48 and 50, are input to Global Logic circuit 62. The all_zero and all_ones outputs of Global Logic circuit 62 are input to mux 66 with the carry-in bit from the sum of the lower 64 bits of the 128-bit operands generating the all_zero signal for bits 101 through 63.

The Hybrid Logic circuit 68 combines the functionality of several L Bit Logic circuits of varying input sizes and the Global Logic circuit, again for varying sizes, to generate the all_zero outputs for bits 73 through 63 and 72 through 63. The outputs of the L Bit Logic circuits 42 and 52 and bits 10 through 8 of operands a and b are input to Hybrid Logic circuit 68. Hybrid Logic circuit 68 generates p (propagate) and g (generate) signals for bits 10 through 8 of operands a and b in the same fashion as the L Bit Logic circuits. Five internal signals of circuit 68: az10, ao10, cod10, az11, and ao11 are defined by the following equations wherein the az, ao, and cod inputs come from circuits 42 and 52:

az10 = az_0 & ~cod_0 & az_1 & ~cod_1 & ~p[8] &

~g[8] & ~p[9] | az_0 & cod_0 & ao_1 & p[8] & p[9] | az_0 &

~cod_0 & az_1 & cod_1 & p[8] & p[9] | az_0 & ~cod_0 & az_1 & ~cod_1 & g[8] & p[9] | az_0 & ~cod_0 & az_1 &

~cod_1 & ~g[8] & ~p[8] & g[9]

ao10 = p[9] & p[8] & ao_1 & ao_0 cod10 = g[9] | p[9] & g[8] | p[9] & p[8] & cod_1 |p[9] & p[8] & ao_1 & cod_0, az11 = az10 & ~cod_10 & ~b[10] & ~a[10] | az10 &

~cod_10 & b[10] & a[10] | az10 & cod_10 & p[10]

ao11 = ao10 & p[10];

wherein a[#] and b[#] in the above equations refer to bits in the operands.

These signals are combined with the carry-in from the sum of the lower 64 bits of the 128-bit operands generating the all_zero signals for bits 73 through 63 and 72 through 63.

all_zero[72:63] = az10 & ~carry_in | ao10 & carry_in, all_zero[73:63] = az11 & ~carry_in | ao11 & carry_in;

The four all_zero signals are combined in combinational logic with the results of zero detection circuitry of the lower 64 bits of the sum of the two 128-operands added separately to generate a final all_zero signal for the blocks of bits of interest in the final sum of the two 128-bit operands. Note that all equations governing the generation of the L and L'Bit Blocks, Global Logic blocks, and Hybrid Logic Blocks are constructed via static logic elements requiring no dynamic circuitry such as line pre-charge.

Figure 5:
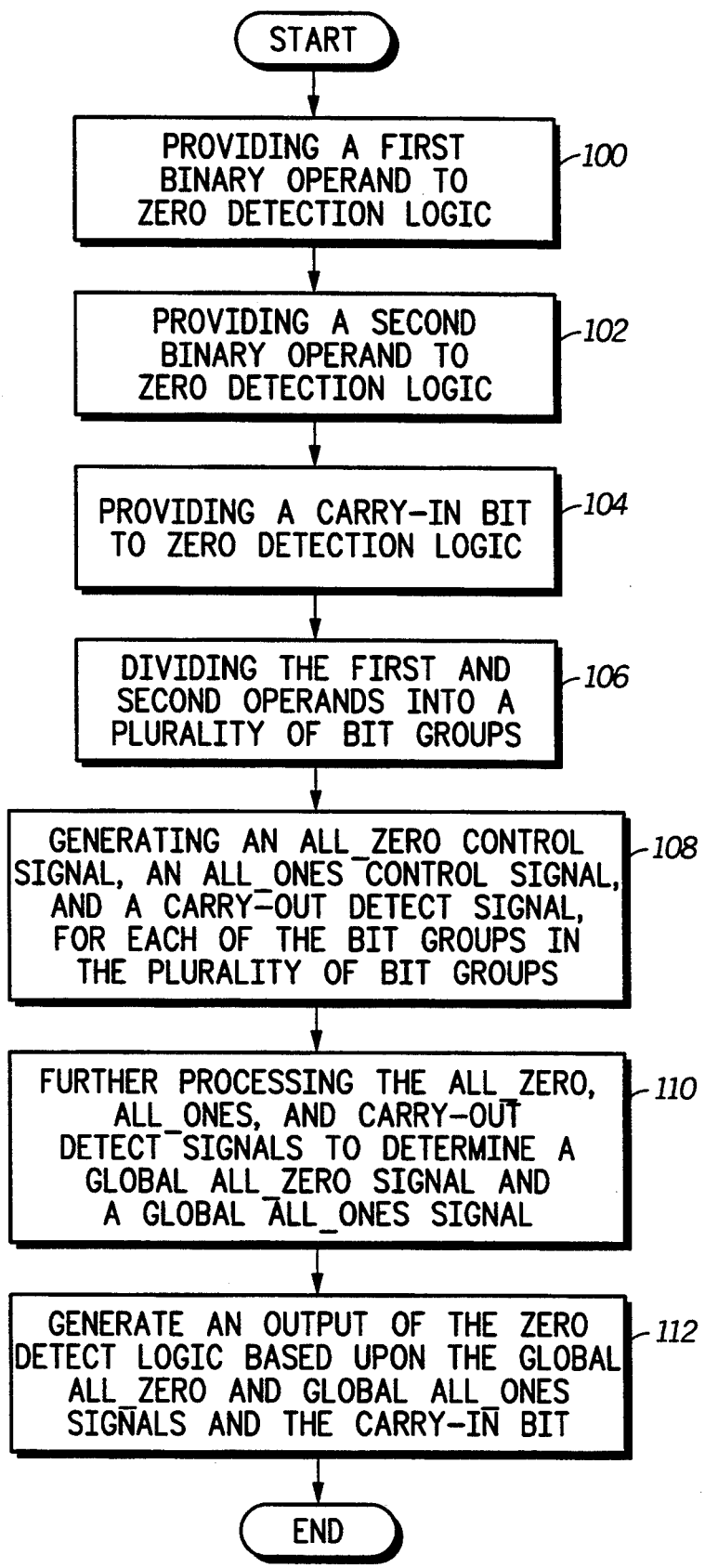
FIG. 5 illustrates, in a flowchart, a method which is used to perform zero detection in accordance with the present invention.

FIG. 5 illustrates a method for providing zero detection in a data processing system. The method of FIG. 5 may, for example, be used within the system illustrated in FIGS. 2-4. FIG. 5 illustrates steps which will accomplish the zero detection. In Step 100 a first binary operand of arbitrary size is input to the zero detection circuitry. In Step 102 a second binary operand of arbitrary size is input to the zero detection circuitry. In Step 104 a carry-in bit, representing the carry out of an addition of the lower order n-bits, n being a positive integer zero or greater, performed by any addition method, is input to the zero detection circuitry. In Step 106, the first and second operands are divided into a plurality of bit groups to be operated on by either L Bit Blocks, with L being a positive integer greater than zero, Global Logic circuits, or Hybrid Logic circuits. In Step 108 the al- l_zero signal, all_ones signal, and, in some cases, a carry-out detect signal, are generated for each of the plurality of bits generated in Step 106. In Step 110, further processing is performed, if necessary, on the all_zero, all_ones, and carry out detect signals generated in Step 108 to generate a global all_zero and all_ ones signal. In Step 112, the global all_zero and global all_ones signal from Step 110 are combined with the carry-in bit of Step 104 to generate a final all_zero signal.

It is possible to perform Steps 100, 102, and 104 in parallel rather than in a serial method. The ordering of Steps 100, 102, and 104 is arbitrary, although the first and second operands of Steps 100 and 102 are required to proceed beyond Step 106, while the carry-in bit of Step 104 is not required until Step 112.

The present invention provides a method and apparatus for providing zero detection in a floating point data processing system. With such a method and apparatus, the problems presented, namely, the problem of the requirement for dynamic circuitry for fast zero detection in a sequential manner with the adder, and the problem of the additional delay of performing the zero detection using static circuitry in a sequential manner, are solved. The problem of dynamic circuitry is one of speed, power, and minimum clock frequency. Dynamic circuitry, in this case, has the advantage of being relatively fast and compact. In the move toward all static designs, logic which was formerly implemented in dynamic circuitry must be reimplemented in static logic. Often times, as is the case with the zero detection circuitry, the direct reimplementation produces circuitry which has greater delay and larger area requirements. To avoid this situation, the design must be rearchitected to remove the zero detection from the critical path. With such a method and apparatus as presented herein, the problem of dynamic circuitry and of sequential delay in the determination of a zero result for a block of bits of a sum of two operands is eliminated.

This method and apparatus has an additional benefit of removing capacitive loading from the outputs of the adder which is used to generate the result of interest. The removal of this additional loading may allow the adder to operate with less delay.

While the present invention has been shown and described with reference to specific embodiments, further modifications and improvements will occur to those skilled in the art. For example, the number of bits applied to the first level of hierarchy may vary given the speed and size requirements. The larger the number of bits applied to each of the L Bit Logic or L'Bit Logic circuits the fewer levels of hierarchy are required. The size and function of the Global Logic circuit and Hybrid Logic circuit blocks could be modified, again for different size operands and partitioning of first and second level functions. The zero detection presented herein is described for an addition function, however, it may easily be modified to provide zero detection for subtraction, or a number of other mathematical functions, as well. In addition, the methods and structures taught herein have been primarily referred to as performing floating point operations, but may be used to perform any zero detect binary operation for purposes other than floating point. Finally, the detection mechanism is readily adaptable for detection of all ones, as well as a number of other possible patterns.

It is to be understood, therefore, that this invention is not limited to the particular forms shown and that it is intended in the appended claims to cover all modifications that do not depart from the spirit and scope of this invention.

What is claimed is:

1. An adder circuit for use in a data processing system, the adder circuit comprising:

circuitry for adding a first binary value having a first predetermined number of bits and a second binary value having a second predetermined number of bits, the circuitry for adding having a first input for receiving the first binary value, a second input for receiving the second binary value, a third input for receiving a carry-in bit, and a first output for providing a sum of the first and second binary values; and zero detection logic having a first input for receiving the first binary value, a second input for receiving the second binary value, and a third input for receiving the carry-in bit, the zero detection logic having both a first output which indicates whether the sum of a portion of the first binary value, a portion of the second binary value, and the carry-in bit produces a zero result and a second output which indicates whether the sum of the portion of the first binary value, the portion of the second binary value, and the carry-in bit produces a result which contains all ones, the sum of the portion of the first binary value, the portion of the second binary value, and the carry-in bit having a third predetermined number of bits, the zero detection logic being able to receive the carry-in bit at a time after receipt of the first and second binary value and still properly generate output signals at the first and second outputs.

2. The adder circuit of claim 1 wherein the first predetermined number of bits is equal to M bits where M is a finite integer greater than zero, the second predetermined number of bits is equal to N where N is a finite integer greater than zero, N being greater than or equal to M, the zero detection logic processes L bits where L is a finite integer less than or equal to N and asserts the output of the zero detection logic if the sum of the L bits produces a binary zero result in the circuitry for adding.

3. The adder circuit of claim 1 wherein the circuitry for adding further comprises:

a third output for providing a carry-out bit.

4. The adder circuit of claim 1 wherein the zero detection logic operates in parallel to the circuitry for adding.

5. The adder circuit of claim 1 wherein the zero detection logic provides an all-zero control signal and a group propagate control signal in response to the first and second predetermined number of bits.

6. The adder circuit of claim 1 wherein the zero detection logic provides a first control signal and a second control signal in response to the first and second predetermined number of bits, the first control signal being asserted if the sun resulting from the first and second predetermined number of bits produces a zero result independent of the carry-in bit and the second control signal being asserted if the sum resulting from the first and second predetermined number of bits produces a result having all logic ones independent of the carry-in bit.

7. The adder circuit of claim 6 wherein the output of the zero detection logic is selectively asserted in response to the first control signal, the second control signal, and the carry-in bit.

8. The adder circuit of claim 7 wherein the output of the zero detection logic is asserted based upon the following:

output=(first control signal & the inverse of carry-in)|(second control signal & carry-in).

9. The adder circuit of claim 1 wherein the zero detection logic further comprises:
  a first circuit for segregating the first and second predetermined number of bits, which are processed by the zero detection logic, into N groups of bits where N is a finite integer greater than zero, the first circuit having N circuit portions, one circuit portion for each of the N groups of bits wherein each of the N circuit portion receives a predetermined one of the N groups of bits, each of the N circuit portions calculates a first control signal and a second control signal in response to the predetermined one of the N groups of bits, the first control signal being asserted by each of the N circuit portions if the sum resulting from the respective predetermined one of the N group of bits produces a zero result and the second control signal being asserted by each of the N circuit portions if the sum resulting from the respective predetermined one of the N group of bits produces a result having all logic ones.

10. The adder circuit of claim 9 wherein the zero detection logic further comprises:
  a global circuit for receiving as input the first and second control signals from each of the N circuit portions, the global circuit logically determining a third control signal and a fourth control signal wherein the third control signal is asserted if the first and second control signals indicate that the sum resulting from the third predetermined number of bits produces a zero result independent of the carry-in bit and the fourth control signal is asserted if the first and second control signals indicate that the sum resulting from the third predetermined number of bits produces a result having all logic ones independent of the carry-in bit.

11. A method for determining whether a sum of a predetermined number of bits of two operands is equal to zero via zero detection logic, the method comprising the steps of:
  providing a first operand having M bits to the zero detection logic, where M is a finite integer greater than zero;
  providing a second operand having M bits to the zero detection logic, where M is a finite integer greater than zero;
  providing a carry bit to the zero detection logic;
  dividing the M bits of the first operand and the M bits of the second operand into a plurality of bit groups, each plurality of bit groups having up to L bits wherein L is a finite integer greater than zero and less than or equal to M;
  providing a first control signal, a second control signal, and a third control signal for each of the plurality of bit groups, the first control signal being asserted if the sum resulting from the up to L bits produces a zero result, the second control signal being asserted if the sun resulting from the up to L bits produces a result having all logic ones, and the third control being asserted if the sum of the up to L bits produces a carry-out and the sum of the up to L bits produces a zero result;
  processing the first, second, and third control signals from each bit group within the plurality of bit groups to provide a first global control signal being asserted if the sum resulting from the up to M bits produces a zero result independent of a carry-in, a second global control signal being asserted if the sum resulting from the up to M bits produces a result having all logic ones independent of the carry-in, the step of processing being able to receive the carry-in, as a late carry-in signal, at a time after receipt of the up to M bits; and
  generating an all-zero control signal from the first and second global control signals and the carry-in.

12. The method of claim 11 wherein the step of generating the all-zero control signal comprises:
  using the all-zero control signal to indicate that an output of a floating point adder circuit is a floating point result containing all logic zeros.

13. The method of claim 11 wherein the steps of claim 11 are performed in parallel to an addition computation occurring in a floating point adder wherein the floating point adder is adding the first operand and the second operand.

14. A method for determining whether the sum of a predetermined number of bits of two operands is equal to zero or all ones, the method comprising the steps of:
  providing a first operand to a zero detection circuit, the first operand having M bits wherein M is a finite integer greater than zero;
  providing a second operand to the zero detection circuit, the second operand having M bits wherein M is a finite integer greater than zero;
  providing a late carry bit to the zero detection logic after providing the first and second operands;
  hierarchically processing the first operand, the second operand, and the carry bit to provide a global control signal which is asserted if a sum resulting from the first operand, the second operand, and the carry bit produces a zero result; and
  hierarchically processing the first operand, the second operand, and the carry bit to provide another global control signal which is asserted if a sum resulting from the first operand, the second operand, and the carry bit produces an all-ones result.

15. The method of claim 14 wherein the step of hierarchically processing the first operand, the second operand, and the carry bit to provide a global control signal comprises:
  using the all-zero control signal to indicate that an output of a floating point adder circuit is a floating point result containing all logic zeros.

16. The method of claim 14 wherein all the steps of claim 14 are performed in parallel to an addition computation occurring in a floating point adder wherein the floating point adder is adding the first operand and the second operand.

17. A zero detection circuit for use in a data processing system, comprising:
  a first input for receiving a first operand;
  a second input for receiving a second operand;
  a third input for receiving a carry bit;
  a plurality of combinational logic circuits wherein each of the combinational logic circuits within the plurality of the combinational logic circuits receives a portion of the first operand and a portion of the second operand as inputs wherein no two combinational logic circuits receive as input an identical portion of the first operand and an identical portion of the second operand, each of the combinational logic circuits within the plurality of the combinational logic circuits generating a first control signal to indicate whether the sum of the portion of the first operand and the portion of the second operand produce a zero result, and each of the combinational logic circuits within the plurality of the combinational logic circuits generating a second control signal to indicate whether the sun of the portion of the first operand and the portion of the second operand produces a result having all logic one values; and a global circuit for receiving each of the first and second control signals from the plurality of the combinational logic circuits, the global circuit providing an output which indicates whether a sum of the first operand, the second operand, and the carry bit produces a zero result in response to the first and second control signals and the carry bit, the global circuit also providing an indication as to whether the result has all logic one values.

18. The zero detection circuit of claim 17 wherein the global circuit provides an all-zero control signal and a all-ones control signal in response to the first and second control signals, the all-zero control signal being asserted if the sum resulting from the first and second operands produces a zero result independent of the carry bit, and the all-ones control signal being asserted if the sum resulting from the first and second operands produces a result having all logic ones independent of the carry bit.

19. The zero detection circuit of claim 18 wherein the output of the zero detection circuit is selectively asserted in response to the all-zero control signal, the all-ones control signal, and the carry bit.

20. The zero detection circuit of claim 19 wherein the output of the zero detection circuitry is asserted based upon the following equation:

output = (all-zero control signal & carry bit) | (all-ones control signal & carry bit).

* * * * *